W. S. SIMPSON.
DISTILLING APPARATUS.
APPLICATION FILED MAR. 18, 1910.
1,008,869.
Patented Nov. 14, 1911.
5 SHEETS—SHEET 1.
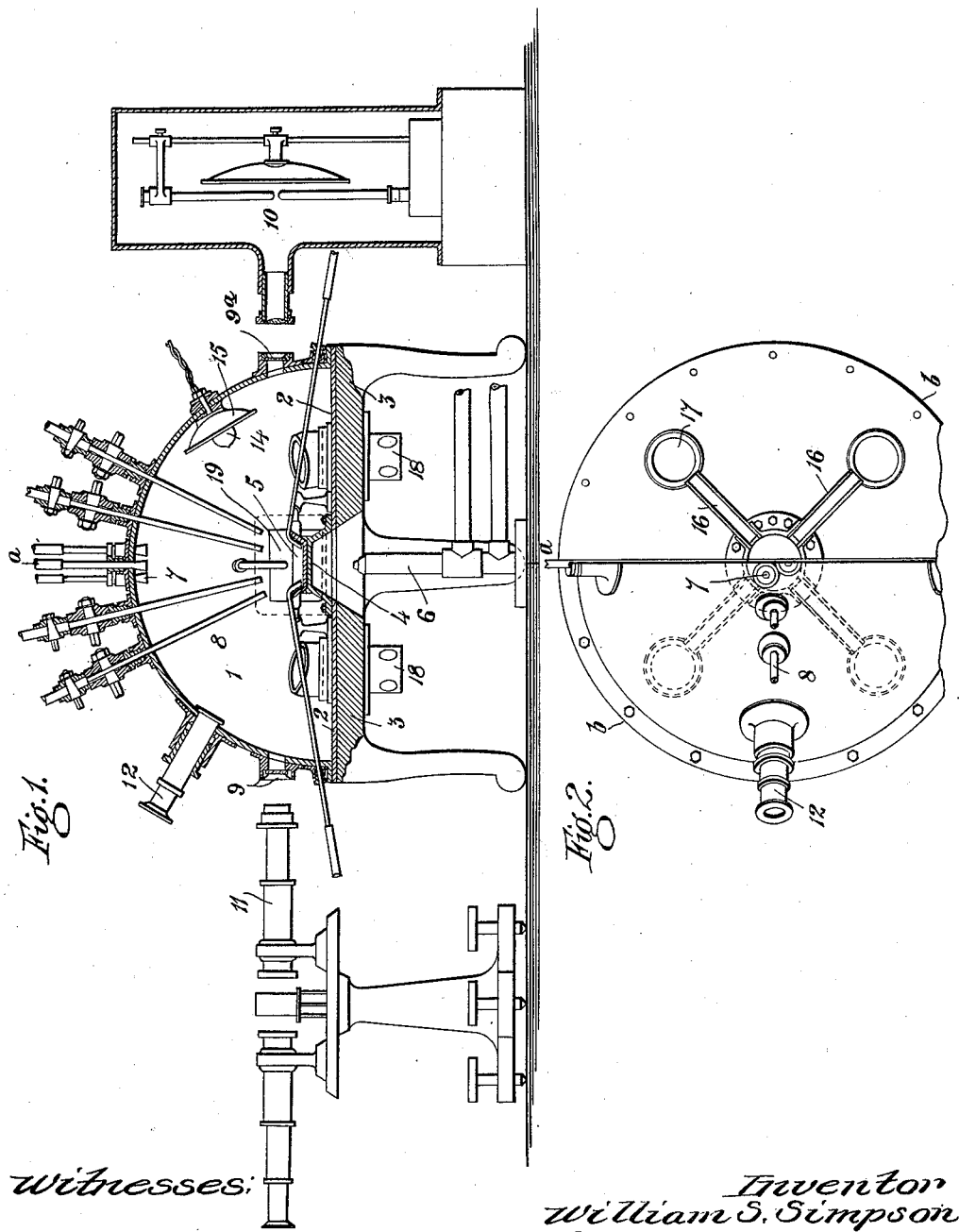

W. S. SIMPSON.
DISTILLING APPARATUS.
APPLICATION FILED MAR. 18, 1910.

1,008,869.

Patented Nov. 14, 1911.
5 SHEETS—SHEET 2.

Witnesses:

Inventor
William S. Simpson

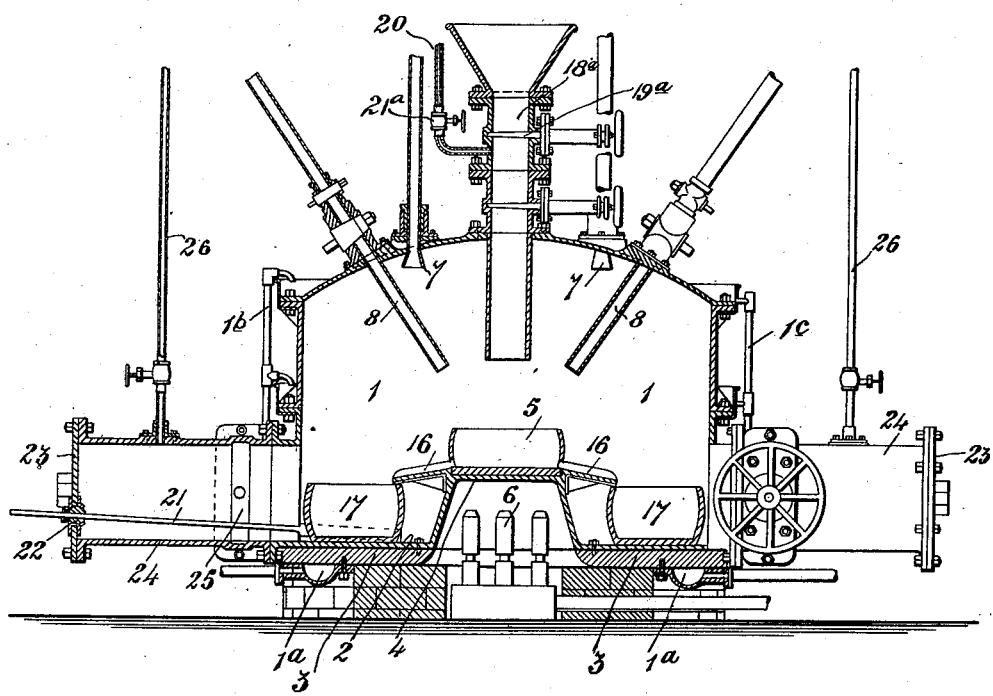

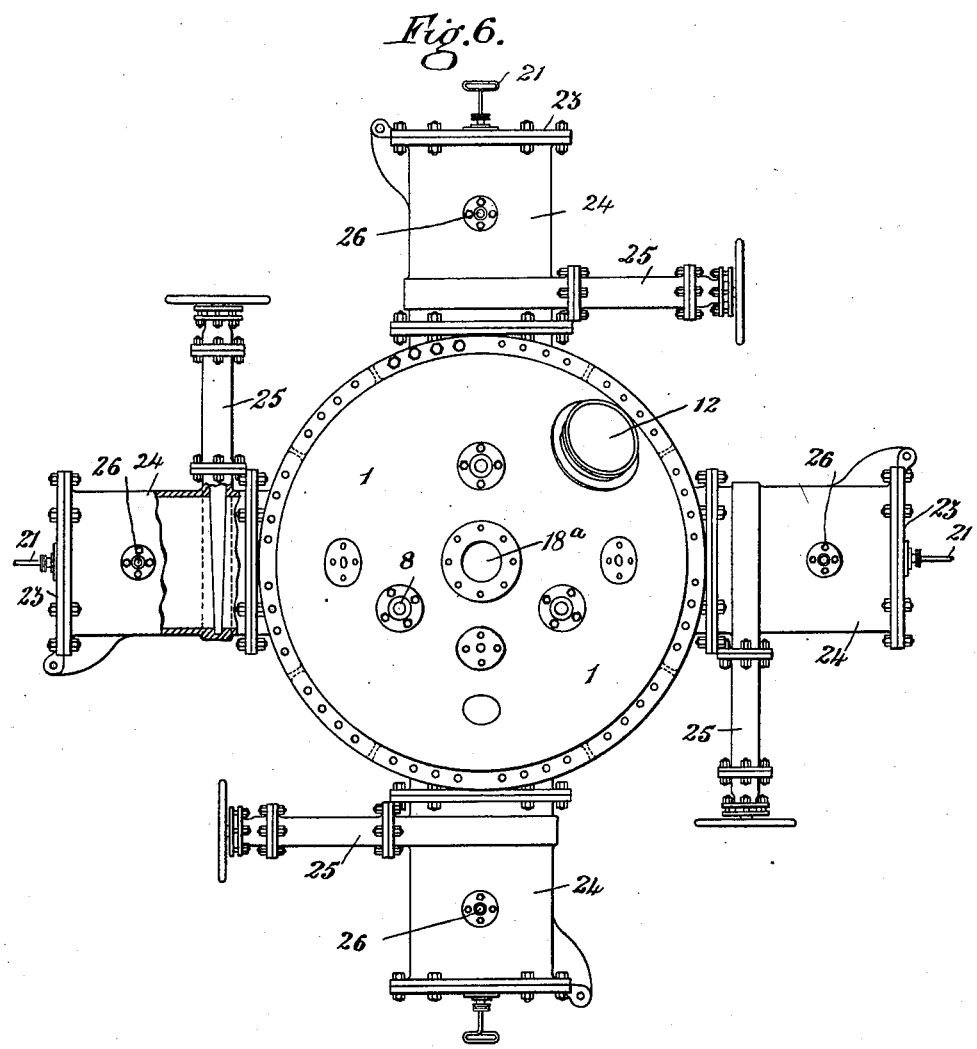

W. S. SIMPSON.
DISTILLING APPARATUS.
APPLICATION FILED MAR. 18, 1910.
1,008,869.
Patented Nov. 14, 1911.
5 SHEETS—SHEET 5.
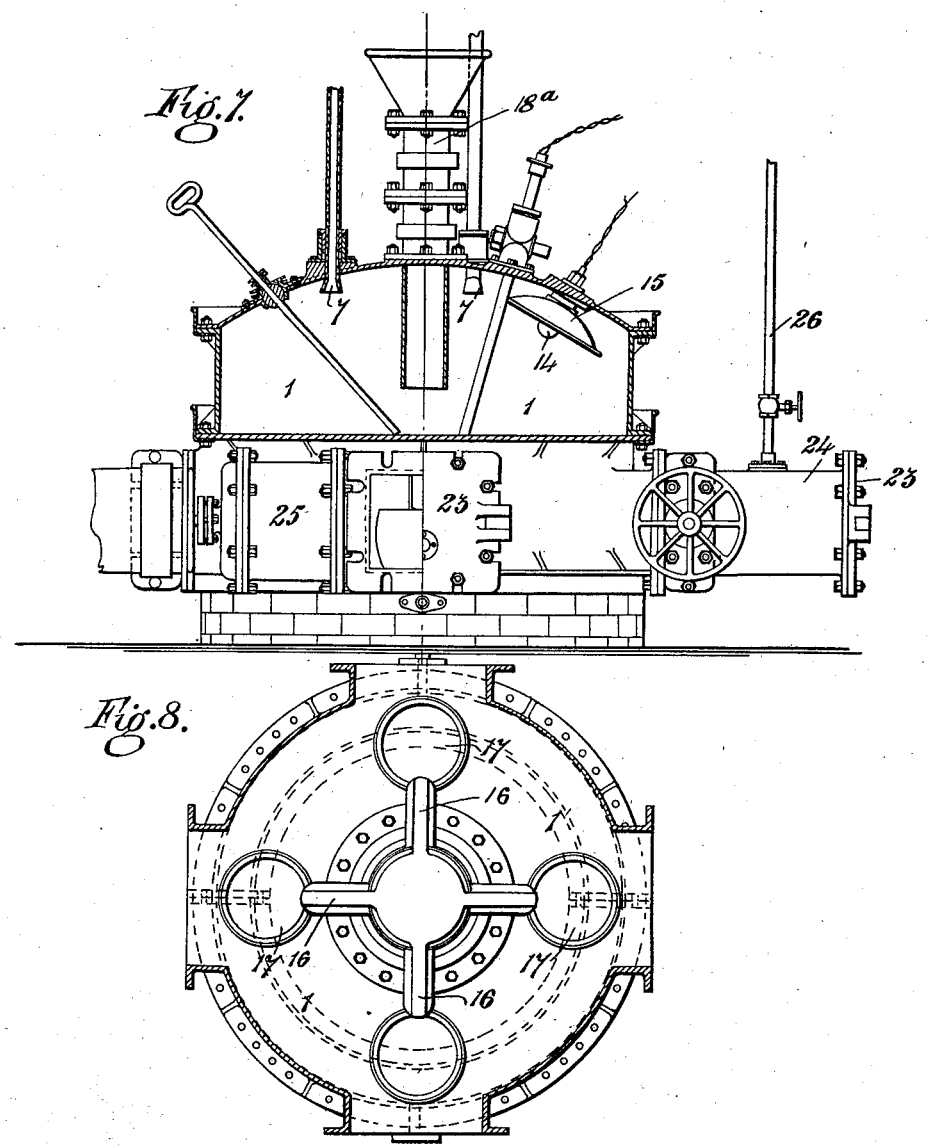

UNITED STATES PATENT OFFICE.

WILLIAM SPEIRS SIMPSON, OF LONDON, ENGLAND.

DISTILLING APPARATUS.

1,008,869. Specification of Letters Patent. Patented Nov. 14, 1911.

Application filed March 18, 1910. Serial No. 550,137.

*To all whom it may concern:*

Be it known that I, WILLIAM SPEIRS SIMPSON, a subject of the King of Great Britain, residing at London, England, have invented certain new and useful Improvements in Distilling Apparatus, of which the following is a specification.

This invention has for its object the distillation *in vacuo* of solids metallic and otherwise or the distillation in series or otherwise of the volatilizable elements contained in various substances: also for separating the gaseous products of such distillation while under the observation of the operator and for reheating, treatment and examination of gaseous elements or compounds which may be introduced into the vacuum chamber for that purpose.

My invention will be clearly understood by the examples of apparatus hereafter described and shown on the annexed drawings in which:—

Figure 3:
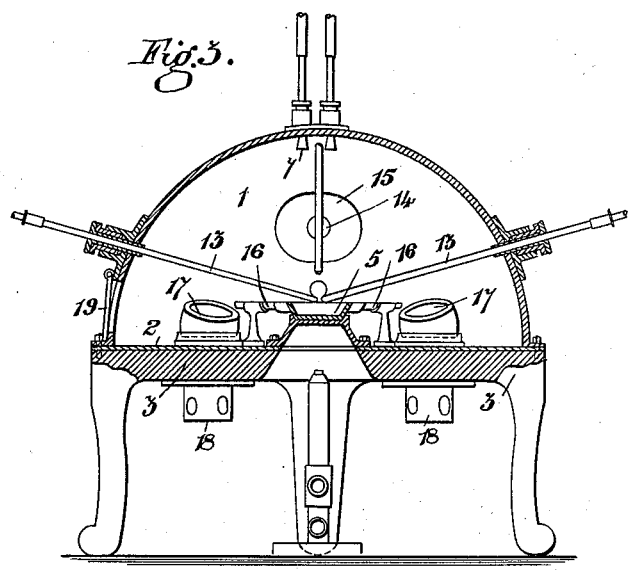
Figure 4:
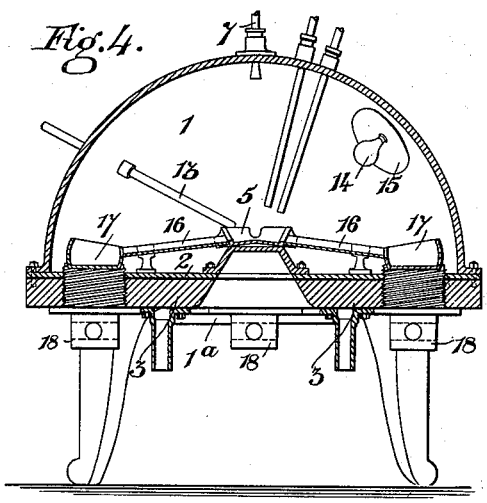

Figure 1 is sectional elevation of an apparatus in simple form and for use in single operations and with a means of illumination and a spectroscope arranged outside. Fig. 2 is a part sectional plan of the apparatus. Fig. 3 is a section of the apparatus on the line $a\,a$ of Fig. 1. Fig. 4 is a section of the apparatus on the line $b\,b$ of Fig. 2. Fig. 5 is a part sectional elevation of an apparatus specially suitable for carrying on the process continually. Fig. 6 is a plan of Fig. 5. Fig. 7 is a view looking from the lower part of Fig. 6. Fig. 8 is a sectional plan of the hemisphere showing the position of the crucible and receivers.

In carrying out the purposes of this invention in a general sense, I construct a metallic vacuum chamber 1 in the form of a dome or hemisphere of suitable size and thickness to admit the creation and maintenance of a high vacuum therein; this hemisphere is fixed in suitable position upon a flat or concave metallic plate 2 laid or mounted horizontally on a suitable supporting base 3 and the connection with the surface of such plate is made airtight in any convenient manner. Such connection may be protected from overheating externally by a water jacket in the form of a hollow ring $1^a$ placed between the center and the periphery of the supporting base 3 or in any other convenient manner, and water pipes may be carried up the sides of the vacuum chamber for conveying water to the joint rings or flanges and carrying it away from same as at $1^b$ and $1^c$. It is protected internally by the slow radiation of heat *in vacuo* under any conditions. In all cases the distance between the center where heat is generated or applied and the base, is sufficiently great to obviate any difficulty in keeping joints airtight. In the center of such plate 2 and vertically beneath the center of the hemisphere 1 provision is made for the introduction of a small platform 4 raised a few inches or more above the level of the horizontal plate 2 which platform 4 serves as a support to the crucible 5 or other suitable vessel (also introduced within the vacuum chamber) into which the various substances under treatment may be placed or conveyed in any convenient manner. Directly beneath the internal platform 4 supporting such crucible or vessel 5, but outside the vacuum chamber there is placed the heating apparatus 6 which may be of the Bunsen burner or blowpipe type for use with gaseous fuel or hydrocarbons or may be any other convenient type of heating apparatus including the electrical. In some cases electrical heat may be applied inside the vacuum chamber and either to the crucible or directly to the substances under treatment.

The hemispherical vacuum chamber 1 is provided (1) with a suitable outlet or outlets 7 connected with a pipe or pipes through a condenser into which the various products of distillation are drawn by a vacuum created and maintained by means of a suitable air-pump, (2) with suitable pipes 8 for the introduction of gaseous or solid substances into the crucible 5, (3) with suitable observation ports 9, $9^a$ covered with glass or other transparent material by means whereof (*a*) light may be thrown by reflection or otherwise into the crucible and (*b*) rays of light from an external arc lamp 10 may be caused to pass into the vacuum chamber 1 and through the incandescent gases arising from the crucible 5 and then projected through an opposite port $9^a$ into an apparatus 11 for spectrum analysis suitably placed outside the vacuum chamber (*c*) a convenient means 12 may be afforded for the operator to observe the various stages of the operation. The products of distillation after withdrawal from the vacuum chamber may be conducted in any convenient manner to a condensing chamber or apparatus suitable in each case for the special purposes required.

According to Figs. 1 to 4, the hemisphere 1 may be exhausted by the pipes 7 while any desired gases may be introduced by the pipes 8 on to the crucible 5 which crucible is either heated by the burners 6 or by the electric carbons 13 which are connected with the electric power in a usual manner. When the heating medium is outside the apparatus I provide an electric arc lamp 10 outside the apparatus and from which the light is projected through the lens 9ª across the crucible out of the lens 9 and into the spectroscope 11 by means of which suitable analysis of the gases arising from the crucible can be effected. I also provide an electric light 14 inside the apparatus to illuminate the crucible and provide same with a concave mirror 15 which serves to concentrate and project the rays of light from the lamp 14 on to the crucible, this lamp 14 being used in substitution for the lamp 10 and in this case observation can be made through the eye glass 12. The crucible 5 is connected by troughs 16 to receiving pots 17 so that the metal contained within the crucible 5 can after being melted and treated in the crucible be passed to such receiving pots 17, the passage being effected by tilting the hemisphere in the required direction or by tilting the crucible 5. After the process has been completed the receiving pots 17 which stand upon screw plugs 18 are removed from the apparatus by unscrewing the plugs 18. 19 is a door through which access can be obtained to the interior of the apparatus without removing the hemisphere.

According to Figs. 5 and 7, the apparatus is constructed to carry on a continuous process without it being necessary to destroy the vacuum in the apparatus and for this purpose I provide the top of the hemisphere with an entrance pipe 18ª in which are arranged slide valves 19ª operable for moving in and out.

To supply the crucible with metal, the metal is first placed on the top of the upper slide valve 19ª which is now opened so that the metal can fall onto the lower slide valve, the upper slide valve is then closed and a vacuum is created in between the slide valves by the pipe 20. 21ª is a valve in the pipe 20 which valve is opened during the suction through the pipe 20 and when the suction is complete is closed. The bottom slide valve is then opened and the metal falls into the crucible 5. The receiving pots 17 are removed by long crook handles 21 which project through a ball joint 22 in lids 23 of extension chambers 24 which project from the apparatus 1, and such extensions are each provided with operable slide valves 25. The lids 23 are made airtight and a vacuum is effected between each lid and the slide valve through the pipe 26 in the same manner as the chamber between the slide valves in the entrance pipe. The crook end of the handle 21 is positioned between the lid 23 and the slide valve 25 and there is a vacuum both in the chamber between the lid and slide valves and the hemisphere and when it is required to remove a receiving pot, the slide valve 25 is opened which does not destroy the vacuum created and by manipulating the rod 21 so that its crook end engages the receiving pot it can be drawn into the chamber next the lid 23, the slide valve 25 is then closed and the lid opened to remove the receiving pot and when it is required to replace the receiving pot it is again placed in the chamber and the crook end of the rod placed around it, the lid is closed and a vacuum created, when the slide valve can be opened, the receiving pot placed in position and the slide valve closed so that a continuous operation can be conducted without destroying the vacuum in the hemisphere.

The hereinbefore described apparatus is not suitable for the reduction of iron oxid ores or other metallic oxids.

Apparatus embodying the present invention is applicable chiefly to commercial distillation, although it may be used advantageously for laboratory and research work. Certain ores and other compounds containing lead or zinc may be effectively separated and their constituents volatilized and drawn off in metallic form and without oxidation by means of apparatus embodying the present invention, and it is important frequently to test the substances during the performance of the process by means of spectrum analysis, there being no other means known to science for doing this.

What I do claim as my invention and desire to secure by Letters Patent is:—

1. Apparatus of the character described comprising, in combination, a chamber having means for rendering the same pressure-tight and also means for establishing and maintaining a vacuum therein, a crucible mounted within said chamber, and a pot also mounted within said chamber and arranged to receive material from the crucible.

2. Apparatus of the character described comprising, in combination, a chamber provided with means for creating a vacuum therein, a crucible mounted within the chamber, means for heating material in the crucible, receiving pots also mounted within said chamber and in coöperative relation with the crucible, and troughs for conducting the material from the crucible to the different receiving pots.

3. In an apparatus of the character described, the combination of a chamber having means for maintaining a vacuum therein, a crucible mounted within the chamber and provided with means for heating material therein, receiving pots, and means for removably mounting the receiving pots in coöperative relation with the crucible.

4. In an apparatus of the character described, the combination of a vacuum chamber, a crucible mounted therein, heating means for the crucible, and valve mechanism arranged above the crucible and capable of being operated to permit introduction of material into the crucible without destroying the vacuum within the chamber.

5. In an apparatus of the character described, the combination of a vacuum chamber, a crucible mounted therein, heating means for the crucible, means for introducing material into the crucible without destroying the vacuum in said chamber, receiving pots also arranged within the chamber and in coöperative relation with the crucible, and means for withdrawing the receiving pots from said chamber without destroying the vacuum therein.

6. Apparatus for distilling volatilizable solids and for heating and separating gases *in vacuo* consisting of a hemispherical chamber having bottom and a platform therein for supporting a crucible or other suitable vessel containing the substances to be treated, a vaccum pump connected with said chamber by pipes for withdrawal of products of distillation into condensers, pipes connected with said chamber for the introduction of material into the crucible without breaking the vacuum, observation and other ports in the wall of the chamber, and means for heating said chamber, substantially as and for the purposes described and as illustrated on the annexed drawings.

In testimony whereof I have hereunto set my hand in presence of two subscribing witnesses.

WILLIAM SPEIRS SIMPSON.

Witnesses:
LYNWOOD A. GARDNER,
H. D. JAMESON.

Copies of this patent may be obtained for five cents each, by addressing the "Commissioner of Patents, Washington, D. C."